No. 617,497. Patented Jan. 10, 1899.
P. ARGALL.
CYANID FILTER TANK.
(Application filed May 21, 1898.)
(No Model.) 2 Sheets—Sheet 1.
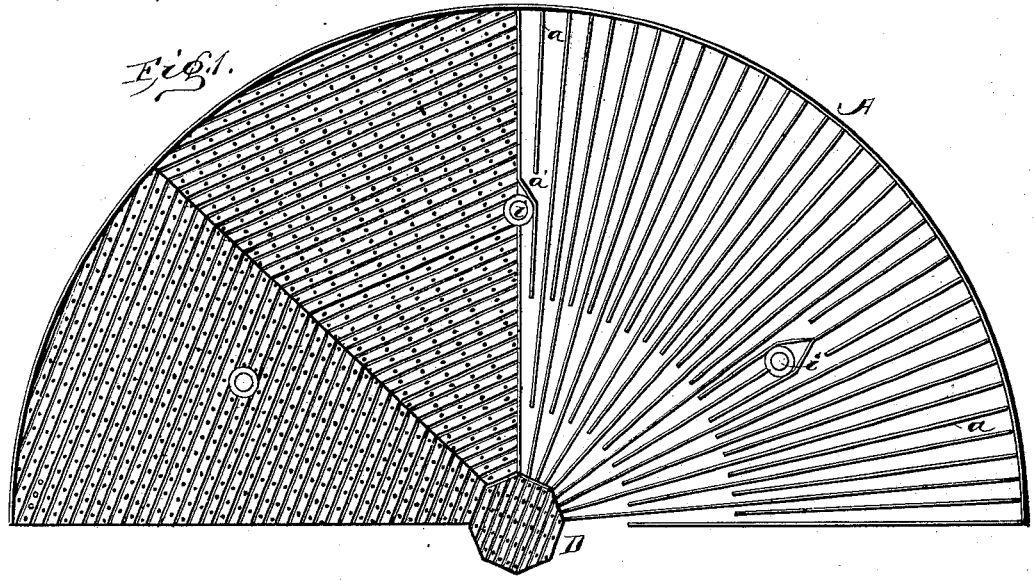
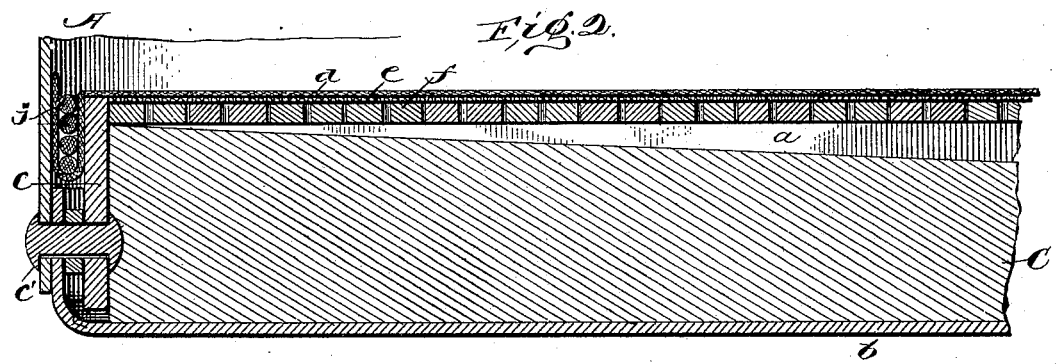
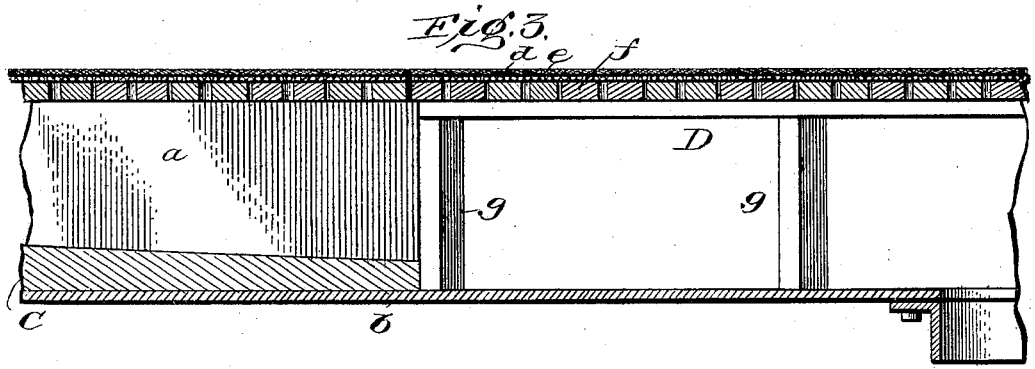
Witnesses:
J. M. Fowler Jr.
Walter R. Payne.
Inventor:
Philip Argall,
by Henry H. Bates,
Attorney.

No. 617,497. Patented Jan. 10, 1899.
P. ARGALL.
CYANID FILTER TANK.
(Application filed May 21, 1898.)
(No Model.) 2 Sheets—Sheet 2.
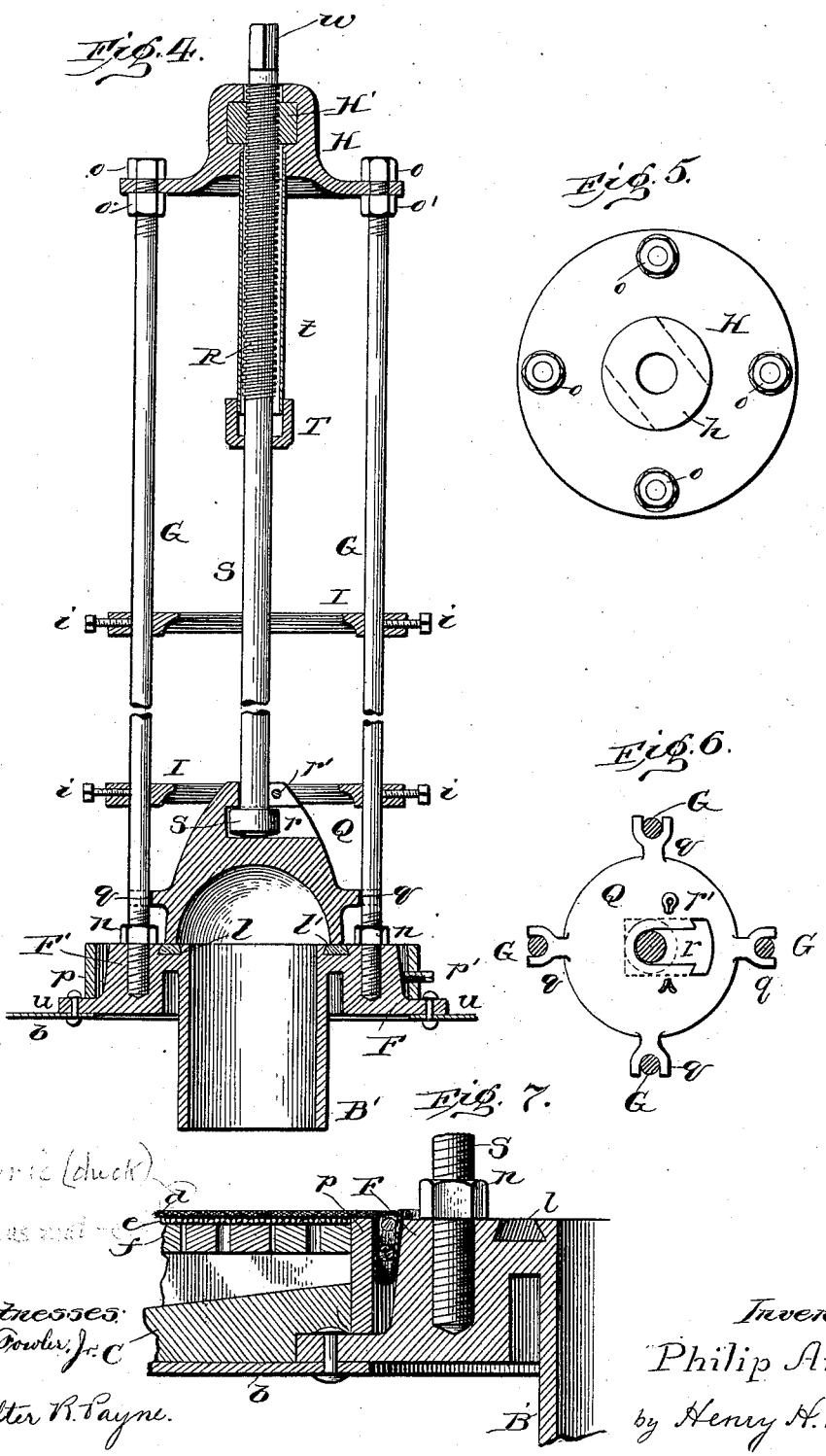
Witnesses:
JM Bowler, Jr.
Walter R. Payne.
Inventor:
Philip Argall,
by Henry H. Bates,
Attorney.

UNITED STATES PATENT OFFICE.

PHILIP ARGALL, OF DENVER, COLORADO.

CYANID FILTER-TANK.

SPECIFICATION forming part of Letters Patent No. 617,497, dated January 10, 1899.

Application filed May 21, 1898. Serial No. 681,307. (No model.)

*To all whom it may concern:*

Be it known that I, PHILIP ARGALL, a citizen of the United States, residing at Denver, in the county of Arapahoe and State of Colorado, have invented certain new and useful Improvements in Cyanid Filter-Tanks; and I do hereby declare the following to be a full, clear, and exact description of the invention, such as will enable others skilled in the art to which it appertains to make and use the same.

My invention relates to improvements in filtering-tanks for the treatment of ores by the cyanid process. In cyaniding ores the tendency has been constantly in the direction of larger tanks. As heretofore constructed, the tanks have had several defects which this invention is designed to remedy: first, defective filters; second, irregular tank-bottoms, making it impossible to draw off the rich solution thoroughly, involving considerable loss, and, third, inefficient discharge-valves.

In the drawings forming a part of this specification, Figure 1 is a plan view showing the construction of the bottom portion of a fifty-foot tank before the filtering layers are applied, with location of discharge-valves and showing central removable trap-door. Fig. 2 is a vertical section of the outer portion of the bottom of the tank, showing filter layers, mode of packing the filter at the sides of the tank, level filter-floor, and sloping cement drainage-gutters. Fig. 3 is a vertical section of the central portion of the bottom of the tank, showing a portion of the removable door on supports standing at a level with the floor, the terminals of the cement gutters, and one-half of the central solution-discharge pipe. Fig. 4 is an elevation, partly in section, of one of the discharge-valves. Fig. 5 is a plan view of the cast-iron cap at top of valve-frame. Fig. 6 is a plan view of the valve. Fig. 7 is a detail sectional view of mode of packing the top filter layer about the discharge-valves.

Like letters of reference refer to like parts in the several figures.

A is the metallic wall of the tank, made, preferably, of steel or iron rolled plate about three-sixteenths of an inch thick and six feet high for a tank fifty feet in diameter, to which is secured a horizontal bottom $b$. On this bottom joists $a$ are laid, as shown in Fig. 1, extending from near the center in a practically radial direction to the perimeter. These joists are fastened to the tank-bottom $b$, preferably by bolts, to hold them firmly in position.

$c$ is a packing-ring extending all around the tank sides within a short distance thereof, leaving a crevice of, say, one inch wide and securely united thereto by rivets $c'$. The outer ends of the joists abut against this ring, and the ring stands enough higher than the level of the joists to allow for the thickness of the filter-floor and the permeable filter-covering $e$ to be laid thereon. The space between the radial joists is then filled with some plastic substance C—such as cement, mortar, asphaltum cement, or other equivalent material—which sets into a hard liquid-proof mass commencing at the packing-ring, at which point the cement is level with the joists, and sloping thence regularly toward the center to form gutters between the joists, running down to practically nothing at the central door, with a fall practically equal to the height of the joists at the circumference.

The joists are covered with a filter-floor $f$ of narrow planking, laid so as to form interstices for the passage of the liquid. Practically in a tank of this diameter I lay them about six inches wide and one-fourth of an inch apart and bore them with holes $h$—say three-fourths of an inch in diameter and about four inches from center to center—a portion of which are shown in Fig. 1, or the planking may be of much narrower width— say three inches—in which case the holes may be dispensed with. The object of the interstices is to serve for the passage of the solution in the tank to the cement gutters below.

D is a central door covering the central discharge-opening or solution-drain, mounted on supports $g$, so as to be flush with the filter-floor, covered with perforated planks laid with crevices like the rest of the flooring and made removable to afford access to the solution-discharge pipe B and to facilitate the cleaning of the gutters and the filter.

On the top of the perforated planking both of the floor and the removable door is laid a covering of cane or cocoa matting $e$ or similar fibrous and porous material, ending at the packing-ring, and on top of this is laid a layer of pervious textile fabric $d$, such as ten-ounce duck, the latter being made enough larger than the tank-floor to allow for packing by being looped and driven down into the crevice between the tank side and the packing-ring c, with one or more circuits of soft rope j forced into the space between the folds, making a simple and tight joint, as shown in Fig. 2.

In the cyanid treatment of ores in leaching-tanks as heretofore constructed the ore is often sluiced out through valves in the side of the tank or bottom discharge-valves operated from beneath the tank. One portion of my present improvement consists in providing a valve located on the tank-bottom which can be operated from above. For a tank fifty feet in diameter I usually provide six valves, located at intervals about midway between the center and circumference of the tank and equally distributed around the tank, as shown at i i, Fig. 1. The radial joists are so disposed about these valves as not to interfere with the continuity of the drainage-gutters, as at a'. Fig. 4 shows an elevation of the improved valve.

F is a base-casting riveted or otherwise secured to the tank-bottom b by flange u, having a discharge pipe or conduit B', extending below the bottom of the tank. Said casting has a rising boss F', recessed, as at l, to contain a valve-seat l', of rubber or other suitable material for the purpose.

p is a packing-ring surrounding the boss of the casting with a small interval, held in position by set-screws—three or more—one of which is shown at p'. This ring, as well as the top or boss of the casting F, comes up level or flush with the top of the filter-floor, including the permeable covering of matting, and its object is to afford a means for packing the joint of the filter in a way similar to that described for packing the juncture of the filter-floor with the circumferential wall of the tank. (Illustrated in Fig. 2.) The mode of packing the joint of the valve-base with the filter-floor is shown in Fig. 7.

Rising perpendicularly from the boss F' of the base-casting and firmly secured therein are three or more (preferably four) upright rods or standards G, which sustain and support the top structure or head-casting H and take the strain when the valve is screwed down tight on its seat. These standards G are preferably screw-threaded as a means of securing them in the base-casting and tightened by means of locking-nuts n n. The said standards G are also screw-threaded at the top, and the head-casting H is adjusted to position and sustained on them by means of nuts o o o' o'.

Q is the valve, taking seat on the valve-seat l'. It has projections q q, corresponding in number to the number of the standards G, embracing the latter and sliding on the same in the manner of guideways as the valve traverses up and down.

I is a stiffening-ring embracing the standards G and secured thereto by set-screws i. One or more may be employed, the function being to hold the slender guide-standards true and parallel and prevent them from spreading under compression, the said standards being, for a tank six feet deep, over seven feet long to carry the top structure well above the liquid in the tank.

The valve Q is operated by means of a revoluble valve-stem S, having a head s rotating in the slotted recess r and confined therein by a cotter-key r', so as to be readily removable therefrom. Said stem S is screw-threaded at its upper extremity for a suitable distance sufficient for the ample operation of the valve, which screw-thread passes up through a wrought iron or steel nut H', borne in the head-casting H by means of a slotted bearing h, Fig. 5, so as to be removable to facilitate repairs. The screw-threads R are preferably of the square variety to take the thrusting strains upon the same in compressing and lifting the valve. Said screw-threaded portion R is inclosed in a pipe or casing t, secured in the head-casting H and terminating at its lower extremity in a stuffing-box T, the object of the device being to protect the screw-threads from access of sand and grit. The stem S is surmounted at the top by a provision for turning with a wrench or other lever-like implement. As shown it has a square head w, on which a wrench can be applied.

The valve is operated as follows: When a charge is ready for sluicing, a wrench or other lever-like means is applied to the valve-rod head, whereby the valve is screwed up, opening communication between the charge in the tank and the discharge-pipe B', which gives a full clear opening. In this tank the filter-floor is entirely level, and the discharge-valves are flush with the filter-cloth, permitting a complete discharge, while the inclined gutters beneath the filter drain off thoroughly all solutions passing through the filter, as all the former irregularities in the tank-bottom are filled with cement, furnishing a smooth, continuous, and uniformly-sloping surface, which conveys all the solution to the drain-pipe B, provided in the center of the tank-bottom. The removable trap-door D gives easy and complete access to this pipe and the terminals of the inclined gutters, making the filters and gutters easy to keep clean, while the discharge-valves are readily reached and operated from above by means of bridges provided for the purpose.

I claim and desire to secure by Letters Patent—

1. In a cyanid filter-tank, a level tank-bottom, having a central discharge-opening, converging gutters located on said bottom, sloping toward said central opening, a level filter-floor above said gutters, having interstices to allow of the passage of liquids, and layers of permeable fibrous filtering material over said floor, substantially as specified.

2. In a cyanid filter-tank, a level tank-bottom, having a central discharge-opening, sloping gutters thereon, converging toward said central opening, a level filter-floor above said gutters, having interstices, a permeable layer upon said floor, and a permeable fabric as a top filter-layer, packed at the circumference, substantially as specified.

3. In a cyanid filter-tank, a level tank-bottom, having a central discharge-opening, sloping gutters thereon, converging toward said central opening, a level filter-floor above said gutters, having interstices, a permeable layer upon said floor, a permeable fabric as a top filter-layer, packed at the circumference, and a central removable door, flush with the filter-floor, and similarly perforated and covered, substantially as specified.

4. In a cyanid filter-tank, a level tank-bottom, having a central discharge-opening, sloping gutters thereon, converging toward said central opening, a level filter-floor above said gutters, having interstices, a permeable layer upon said floor, a permeable fabric as a top filter-layer, packed at the circumference, and discharge-openings at intervals through said filter floor and covering, having valve-seats level with said filter-covering, and valves to close said openings, with means for operating said valves, extending above the liquid-level of the contents of the tank, substantially as specified.

5. In a cyanid filter-tank, a vertical metallic side or wall, a horizontal bottom secured thereto, having a central opening, a packing-ring secured to the inside of said wall, near the bottom, with a spacing, a system of level joists converging from the perimeter toward the center, upon said horizontal bottom, a plastic filling between said joists sloping downward from the packing-ring regularly toward the central opening, a level floor with interstices laid upon said joists, permeable filtering material upon said floor, and a covering of textile fabric, the outer margin of which is packed into the crevice between the packing-ring and the vertical wall, substantially as specified.

6. In a cyanid filter-tank, a vertical side or wall, a horizontal bottom, having a central discharge-opening, joists upon said bottom, converging from the perimeter toward said central opening, cement filling between said convergent joists sloping regularly downward from the perimeter toward the center, forming inclined gutters, a level floor with interstices, upon said joists, around a central space, a removable door occupying said central space, flush with the said floor, and layers of permeable material upon said floor and said door, substantially as specified.

7. In a cyanid filter-tank, a horizontal bottom having a central discharge-opening, convergent sloping gutters thereon, inclined toward said central opening, a level floor having interstices, over said gutters, a permeable filtering layer upon said floor, discharge-valve outlets inserted in said floor secured to said horizontal bottom, having rising bosses F', packing-rings $p$ around said bosses, and a textile top filter-covering, packed into the crevice between said packing-ring and said boss, substantially as specified.

8. In a cyanid filter-tank, in combination, a horizontal metallic bottom $b$, having a central discharge-opening, level joists on said bottom converging from the perimeter toward the center, plastic filling between said joists sloping regularly from the perimeter toward the center, a level floor over said joists, a permeable filter layer thereon, castings F located at intervals, secured to said horizontal bottom, said castings having discharge-pipes B' and bosses F', valve-seats $l'$ on said bosses, rising guide-standards G secured in said bosses, and valves Q guided by said standards and taking seat on said valve-seats, substantially as specified.

9. In a cyanid filter-tank, a horizontal tank-bottom $b$, valve-base F secured to said bottom, discharge-pipe B', boss F', inserted valve-seat $l'$, rising standards G, secured in said boss F', valve Q, having arms $q$, guided by said standards, and means for moving the valve up and down, substantially as specified.

10. In a cyanid filter-tank, the base-casting F, having discharge-pipe B', boss F', and means for securing said base to a tank-bottom, in combination with upright guide-standards G, valve Q, screw-threaded rotary valve-stem S, and head-casting H, having removable nut H', substantially as specified.

11. In a cyanid filter-tank, the combination of the base-casting F, having discharge-pipe B', flange $u$, for attachment to a tank-bottom, upright standards G, G, head-casting H, and stiffening-rings I, with adjustable means of attachment to the guide-standards, whereby the latter are kept parallel, substantially as specified.

12. The combination of the valve-stem S, screw-threaded at R, with head-casting H, casting $t$, and stuffing-box T, substantially as specified.

In testimony whereof I affix my signature in presence of two witnesses.

PHILIP ARGALL.

Witnesses:
WILLIAM B. TEBBETTS,
H. M. MUNROE.